April 25, 1967      A. F. ROSSI      3,315,452

SELF-SHARPENING ROTARY MOWER BLADE

Filed Sept. 16, 1964      3 Sheets-Sheet 1

INVENTOR
Angelo F. Rossi

BY Sabin C. Bronson
ATTORNEY

April 25, 1967  A. F. ROSSI  3,315,452
SELF-SHARPENING ROTARY MOWER BLADE
Filed Sept. 16, 1964  3 Sheets-Sheet 2
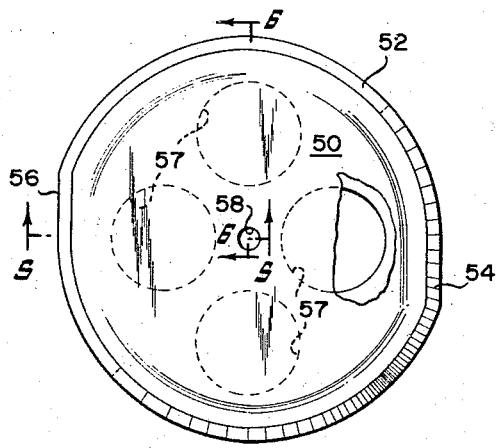
Fig. 4
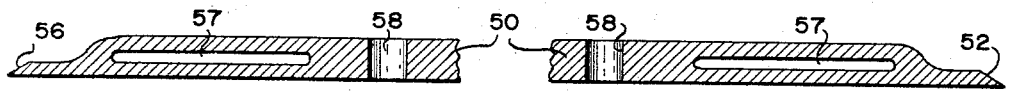
Fig. 5  Fig. 6
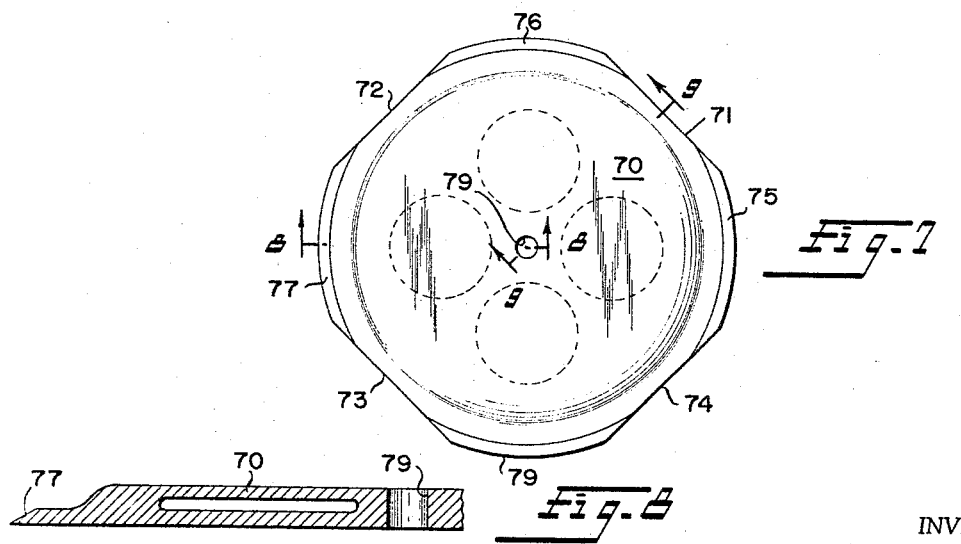
Fig. 7
Fig. 8
Fig. 9
INVENTOR
Angelo F. Rossi
BY Sabin C. Bronson
ATTORNEY April 25, 1967  A. F. ROSSI  3,315,452
SELF-SHARPENING ROTARY MOWER BLADE
Filed Sept. 16, 1964  3 Sheets-Sheet 3
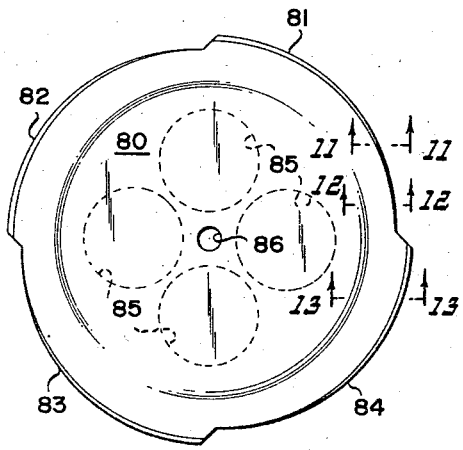
Fig.10
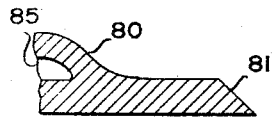  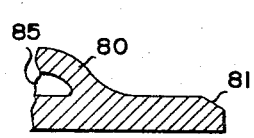  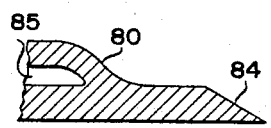
Fig.11  Fig.12  Fig.13
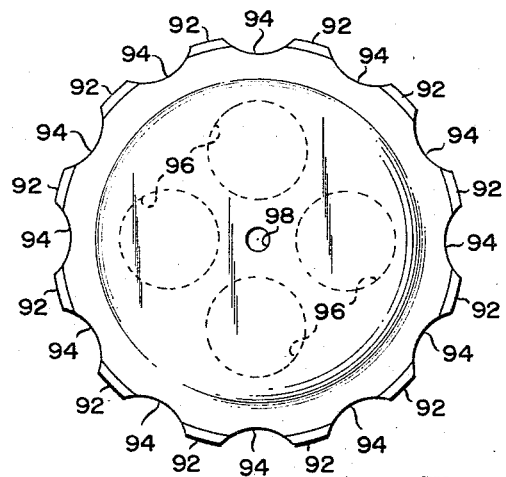
Fig.14
INVENTOR.
Angelo F. Rossi
BY
Sabin C. Bronson
Attorney

United States Patent Office 3,315,452
Patented Apr. 25, 1967

3,315,452
SELF-SHARPENING ROTARY MOWER BLADE
Angelo F. Rossi, 1671 Donalor Drive,
Escondido, Calif. 92025
Filed Sept. 16, 1964, Ser. No. 396,881
5 Claims. (Cl. 56—295)

This invention relates to lawn mowers, and especially to power operated mowers of the rotary disc type.

The ordinary rotary blade mower is quite dangerous to operate and even though manufacturers of such are providing the casing which surrounds the blade with skirts, still the rotating blades hit hidden objects in the tall grass being cut and throw them out laterally, many times to the injury of children playing in the yards near the mower. Frequently too, windows are broken by objects thrown by the rotating mower blades.

Lawn mowers must be sharpened frequently, and the more twigs, stones, and hidden objects in the grass being cut that are encountered, the more frequently the blades have to be sharpened.

It is therefore the principal object of this invention to provide a rotary mower blade of substantially circular form to rotate in a plane approximately parallel with the ground surface, and thereby not throw objects encountered thereby from the mower.

Another important object of the invention is to provide means mounted on the mower housing and supporting a grinding element optionally applicable to the cutting edge of the circular cutter for sharpening same while rotating and as desired without removing blade.

Other objects and advantages of the invention will appear in the following description thereof when read in connection with the accompanying drawing forming part of this application, wherein like reference characters indicate like parts, and in which drawing:

FIGURE 4 is a plan view of a modified form of circular disc cutter;

FIGURE 5 is a section on line 5—5 of FIGURE 4;

FIGURE 6 is a section on line 6—6 of FIGURE 4;

FIGURE 7 is a plan view of a further modified form of disc cutter;

FIGURE 8 is a section on line 8—8 of FIGURE 7;

FIGURE 9 is a section on line 9—9 of FIGURE 7;

FIGURE 10 is a plan view of a still further modified form of disc cutter;

Figure 1:
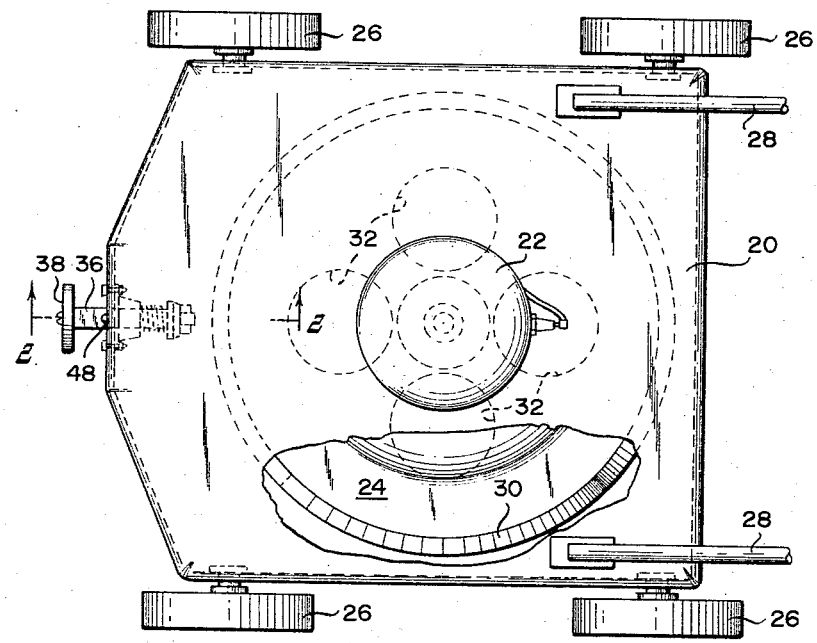
FIGURE 1 is a top plan view of a lawn mower, partly broken away, illustrating one form of circular cutting blade associated therewith.

FIGURES 11, 12 and 13 are respectively sections on lines 11—11, 12—12, and 13—13 of FIGURE 10; and FIGURE 14 is a plan view of another modified form of disc cutter.

Referring now to the drawings in detail and particularly FIGURES 1 to 3, 20 indicates the ordinary pan-shaped housing of a common rotary lawn mower. Upon this housing is mounted a motor 22, the drive shaft of which is vertically disposed and extends through the upper flat surface of the housing at substantially its geometric center and through suitable bearings for support of the shaft. The lower end of the shaft is usually screw-threaded, and the disc cutter 24, having an axial hole therethrough, is mounted on said shaft and a nut applied on the shaft to hold the cutter securely thereto, and fixed so that it never needs to be removed to be sharpened.

The housing is mounted on wheels 26, and handles 28 are attached for guiding the mower manually.

The cutter in this modification is circular with a beveled cutting edge 30 about the periphery thereof so that when rotating and the mower is propelled forwardly, the disc will cut the grass as it engages same. The cutter is cast with hollow portions 32 therein to reduce the weight of the cutter and yet maintain rigidity thereof.

A feature of the invention is the application of a sharpening device to the mower housing which may be optionally adjusted to sharpen the blade when necessary. Mounted on the inside of the peripheral flange of the housing 20, and either at the front or rear thereof is a bearing 32 having a flange 34 which is bolted to the housing flange. Bearing 32 has an axial opening therethrough through which the square shaft 36 of the sharpening element extends. This square shaft has a sloppy vertical fit, to easily align itself to blade. The outer end of said shaft 36 is provided with a manipulating flange 38 by which the sharpening device may be manually moved toward and away from the beveled cutting edge 30 of the disc cutter 24. The grinding element itself comprises a flange 40 fixed on the end of the shaft 36 and between this flange and the adjacent end of the bearing 32 is an expansion spring 42 which constantly urges the flange 40 and shaft 36 toward the cutter. On the outer face of the flange 40 is a V-shaped jaw 44 (1 grinding element), on the inner surfaces of which are two replaceable grinding elements 46 set to the bevel of the cutting edge 30. Just at the outer side of the mower housing, when the sharpening device is in the position shown in FIGURE 2, a transverse hole is drilled through the shaft 36 and a special removable pin 48 is applied therethrough so as to hold the sharpening element away from the disc during normal operation of the mower. When, however, it is desired to sharpen the cutter disc, the pin 48 is removed with one hand while holding flange 38 with the other, and then slowly allowing the spring 42 to advance the grinding element to engage the beveled edge of the cutter, as shown in FIG. 3. When the cutter rotates, the cutting edge will be sharpened. The spring is a light spring, just strong enough to lightly hold the sharpening element at the right pressure against the cutting edge of the disc. The flange 38 is removably mounted on the end of the shaft so that upon its removal and the removal of pin 48, the shaft, spring and sharpener 44–46 may be readily removed when desired, and parts replaced when worn out.

Referring now to the modification of cutter disc 50 shown in FIGURES 4, 5, and 6, it will be observed that in plan view the cutting edge 52 of said cutter has a pair of oppositely disposed flat spots 54 and 56 which are on the shortest radius of the cutter. The peripheral extremity of the cutting edge 52 starts at the upper edge of the flat spot 56 and continues around at a progressively increasing radius to the upper edge of the flat spot 54. Similarly, the cutting edge of the other half of the disc starts at the lower edge of the flat spot 54 and continues around at a progressively increasing radius to the other edge of the flat spot 56.

As in the other modification, the disc is formed with hollow areas 57 symmetrically spaced about the axial opening 58 in the disc.

This modification provides a disc cutter having opposite cutting edges which progressively increase in radius and therefore as they rotate against the work, have a shearing action thereagainst.

In FIGURES 7, 8 and 9 there is shown another modification of the invention and wherein a circular disc 70 is shown, much like that shown in FIGURE 1, but with the cutting edge ground away in four areas 71, 72, 73 and 74, spaced 90° apart. Intermediate of these areas the disc is sharpened as at 75, 76, 77 and 78. These sharpened areas are on the same radius so that as the disc rotates and is moved forwardly into grass to be cut, the sharpened areas will successively whip and cut the grass as engaged by said cutting edges. This cutter is also formed with hollow areas therein symmetrically spaced about the central axial opening 79 therein.

FIGURES 10, 11, 12 and 13 illustrate still another modification of cutter disc to be used with the mower. This disc is illustrated at 80. Said disc is circular in plan view and is provided with four cutting edges, 81, 82, 83 and 84, symmetrically spaced about the periphery of the cutter. Each cutting edge is of progressively increasing radius, the shortest radius of each cutting edge being spaced 90° from the shortest radius of the adjacent cutting edge, so that the longest radius of one cutting edge is immediately adjacent the shortest radius of the next adjacent cutting edge.

As in the other modifications the disc 80 is made with four circular hollow areas 85 therein symmetrically spaced about the axial hole 86 therein, by which the disc may be mounted to the mower.

In the last modification of cutter, shown in FIGURE 14, this disc 90 is also circular in form and provided with twelve equal cutting areas 92 symmetrically spaced about the periphery of the disc. Between each cutting area 92 are arcuate cut-away portions 94. Also in this modification there are four circular hollow areas 96 therein symmetrically spaced about the axial hole 98 therein by which the disc may be mounted to the mower.

Thus FIGURE 1 illustrates a cutter disc, the cutting edge of which is circular and continuous on the same radius for 360°. FIGURE 7 shows a circular cutter disc having four symmetrically spaced cutting edges about the periphery of the disc, all on the same radius, and in FIGURE 14 is a disc cutter somewhat similar to FIGURE 7, except that there are twelve cutting edges symmetrically spaced about the periphery of the disc and all are on the same radius.

In operation, the cutter of FIGURE 1 presents a continuous cutting action against the work, whereas the discs of FIGURES 7 and 14 present alternate cutting and whipping actions against the work.

In FIGURES 4 and 10 the cutting edges are on progressively increasing diameters, there being two such edges shown on the disc of FIGURE 4 and four such edges on the disc of FIGURE 10. Thus when these discs are used in the mower, they move against the work in a slightly shearing as well as cutting movement.

Figure 2:
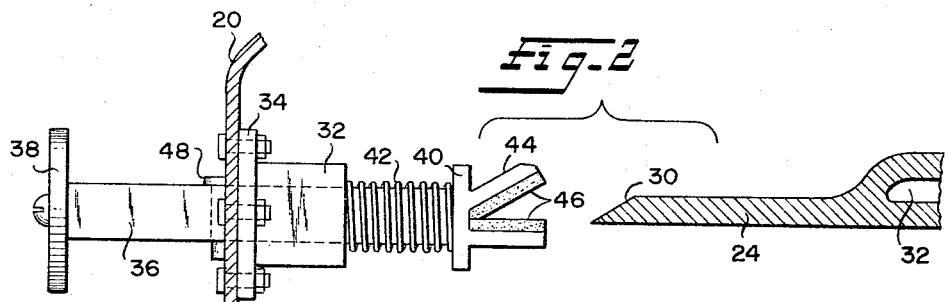
FIGURE 2 is a section on the line 2—2 of FIGURE 1 showing the grinding element disengaged with the cutting edge of the cutter.
Figure 3:
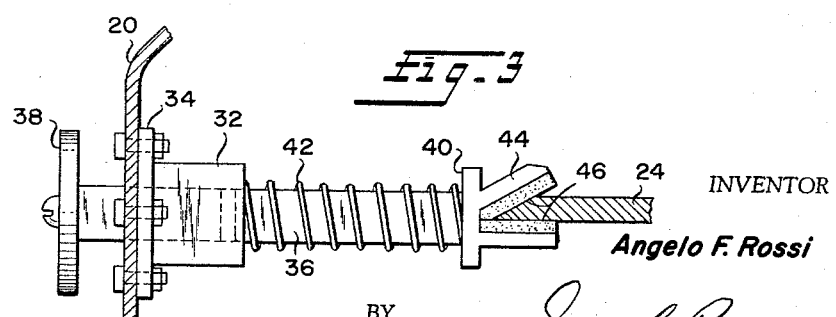
FIGURE 3 is a similar view to FIGURE 2, showing the grinding element in contact with the cutting edge of the cutter for sharpening same.

In all modifications of disc cutters they may be used with the sharpening arrangement shown in FIGURES 2 and 3, with the cutter disc slowly rotating against the grinding element.

It is believed from the above specification the average person familiar with the operation of rotary lawn mowers will clearly understand how the device operates.

I claim:

1. In a rotary disc type lawn mower having a pan-shaped housing, a cutter therefor comprising a cutting disc substantially circular in plan view, means for mounting said disc on said mower about an axis perpendicular to said disc, a beveled cutting edge formed about the periphery of said disc, a bearing mounted on said housing, a reciprocable sharpening element mounted in said bearing and having a beveled jaw for engaging the beveled edge of said disc, resilient means urging said sharpening element toward said cutting disc, and releasable means for holding said sharpening element from engagement with said disc, the axis of said bearing being substantially coplanar with said disc, and said sharpening element being disposed radially of said disc.

2. The structure of claim 1, said releasable means comprising a removable cotter extending through said sharpening element outside of said housing.

3. The structure of claim 1, said bearing having a non-circular axial opening therein, a similar non-circular opening through said housing and axially alined with the bearing opening, said sharpening element including a non-circular shaft extending through said non-circular openings of the bearing and housing.

4. The structure of claim 1, said cutter disc having symmetrically spaced peripheral cutting edges, each on like progressively increasing radii.

5. The structure of claim 1, said sharpening element having a horizontal portion engageable with the lower horizontal face of said cutter disc.

References Cited by the Examiner

UNITED STATES PATENTS

| | | | |
|---|---|---|---|
| 1,336,257 | 4/1920 | Muzzy | 56—295 |
| 2,517,405 | 8/1950 | Moss | 56—25.4 X |
| 2,528,897 | 11/1950 | Mayfield | 56—295 |
| 2,728,176 | 12/1955 | Ritzert | 51—246 |
| 2,826,032 | 3/1958 | Hayes | 56—255 |
| 2,920,436 | 1/1960 | Benson | 56—295 |
| 3,087,289 | 4/1963 | Phillips | 56—295 |
| 3,225,527 | 12/1965 | Spear | 56—295 X |

ABRAHAM G. STONE, *Primary Examiner.*

ANTONIO F. GUIDA, *Examiner.*